Oct. 7, 1969    L. CLAYTON, JR    3,471,751
CIRCUIT FOR CONTROLLING A CLUTCH DRIVE
ASSEMBLY ON A DRIVE MOTOR
Filed Jan. 24, 1966
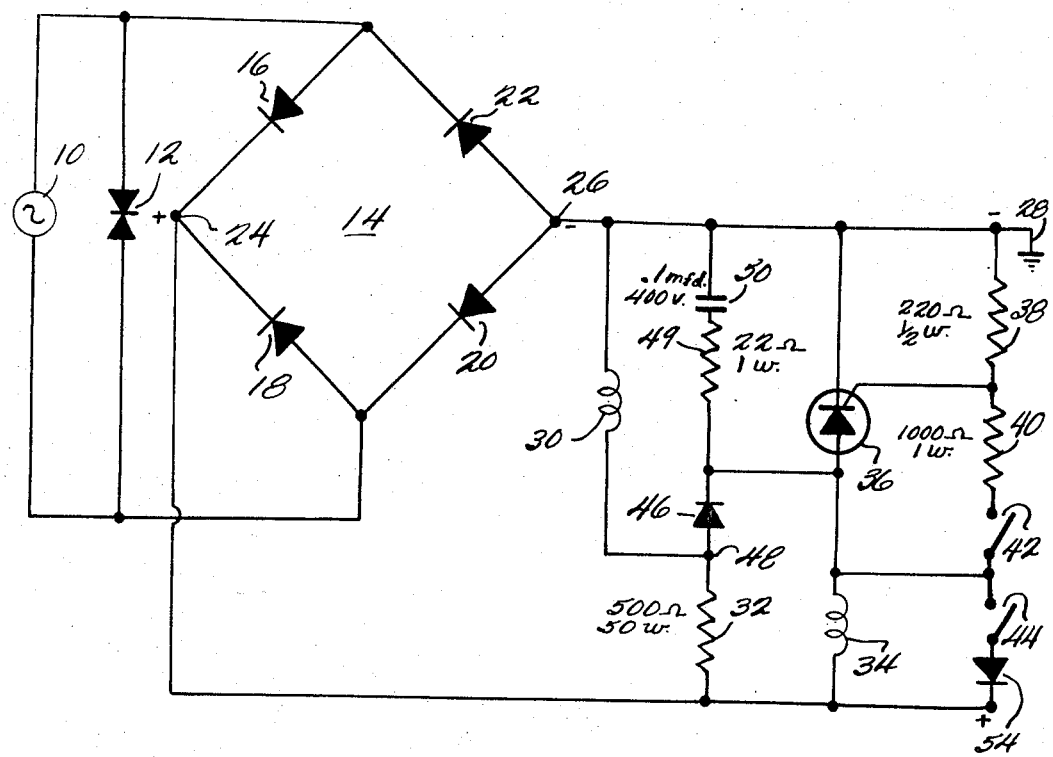
INVENTOR
*LORIMER CLAYTON Jr.*
BY *Cushman, Darby & Cushman*
ATTORNEYS United States Patent Office 3,471,751
Patented Oct. 7, 1969

3,471,751
CIRCUIT FOR CONTROLLING A CLUTCH DRIVE
ASSEMBLY ON A DRIVE MOTOR
Lorimer Clayton, Jr., Atlanta, Ga., assignor to Scientific-
Atlanta, Inc., Atlanta, Ga., a corporation of Georgia
Filed Jan. 24, 1966, Ser. No. 522,634
Int. Cl. H01k 47/22, 47/28
U.S. Cl. 317—137                              3 Claims

ABSTRACT OF THE DISCLOSURE

A circuit for controlling the clutch brake assembly on a drive motor with a source of voltage and an SCR causing the clutch and brake coils to be alternately energized. The SCR is made conductive by closing a manually operated switch and thereby energizes the clutch coil. At the same time, the brake coil is held inoperative. Another manually operated switch is closed to complete an electrical path around the clutch coil, to de-energize the SCR and to energize the brake coil.

---

This invention relates to electrical circuits for controlling the energization of a plurality of load devices and one object is to provide a novel and simplified device for automatic control of said devices in response to completion and interruption of a circuit by a single switching means.

Another object is to control current flowing through the respective load devices by a bistable electronic element or circuit such that when one load device is actuated, the current through the bistable device is of a value corresponding to one of the states of said bistable device and when the other device is actuated, the current through the bistable device is associated with the other state thereof.

In particular, the load devices, controlled by the electrical circuit of this invention, could respectively correspond to a clutch and brake adapted to apply driving and retarding torques respectively to a drive shaft.

In prior art circuits for controlling the brake and clutch assembly of a drive motor, at least two active elements respectively associated with the brake and clutch have been required, such duplication of parts necessarily results in added expenditures, especially when the clutch-brake control circuits are mass produced.

Therefore, it is an object of this invention to provide an improved control circuit for the clutch-brake assembly of a drive motor having a single control element for controlling both the clutch and brake.

It is also an object of this invention to control an electromagnetic clutch and brake successively to effect quick stopping and starting of a rotary driven element.

It is another object of this invention to effect successive energization of the clutch and brake in cycles.

Another object of this invention is to provide an economical, long lasting, and simple control circuit for obtaining a switching or latching action in response to a momentary contact closure.

Other objects and advantages of this invention will become apparent to those of ordinary skill in the art upon reading the appended claims and the following detailed description of an illustrative embodiment of the invention, in conjunction with the drawing, in which an electrical circuit is shown which illustrates a typical embodiment of the invention.

This invention will be described with respect to a control circuit for successively or alternately energizing two load devices which are, respectively, the clutch and brake of a drive motor. It is to be understood that the control circuit of this invention is applicable for the successive or alternate energization of any load device.

Referring to the drawing, there is shown a source of alternating current voltage 10. Back-to-back voltage limiting diodes 12 are connected in parallel to the source 10 to prevent voltage surges therefrom. These limiting diodes may be of the selenium surge-protection type. A full-wave rectifier 14, comprising diodes 16, 18, 20 and 22 is also connected in parallel across the source 10. The rectifier 14 has a positive output terminal 24 and a negative output terminal 26 which may be grounded as shown at 28.

A brake coil or brake control means 30 is connected to terminal 26 and through a resistor 32 to the terminal 24. A clutch coil or clutch control means 34 is connected to terminal 24 and to the terminal 26 through silicon controlled rectifier or bistable switching element 36. The silicon controlled rectifier (SCR) 36 has its anode connected to the coil 34, and its cathode connected to the terminal 26. The control gate of the SCR 36 is connected between a pair of biasing resistors 38 and 40. Switch 42, upon being closed switches the SCR 36 into its state of high current conduction, thereby energizing the clutch coil 34 connected in series circuit therewith. Further, switch 44 together with diode 54 is connected across the coil 34 to switch the SCR 36 to its low current conduction state (or no current conduction state) and thereby de-energize the clutch coil 34 and energize the brake coil 30. Switches 42 and 44 typically are of the momentary contact type.

The SCR 36 may be thought of as a bistable element (that is, it is capable of conducting two different currents while maintaining an equilibrium condition in both current conduction states) even though it conducts practically no current when it is turned off, since the no current condition obviously corresponds to zero current and is therefore one current conducting state of an element having two current conduction states. A diode 46, is connected from a junction 48 between the brake coil 30 and the resistor 32 to the anode of the SCR 36. This diode permits shunting of the brake coil 30 during energization of SCR 36. Resistor 49 and capacitor 50 are connected in series, both of these being connected in parallel across the SCR 36 to prevent transient voltages from energizing the SCR 36.

Having now described the structural features of the control circuit, a description of its operation will now be given. It will be assumed that it is desired to energize the clutch coil 34. This is done by closing the switch 42. The full-wave rectifier 14 provides an output voltage which pulsates in such a way, as is well-known, that positive surges of voltage regularly occur in succession at the output terminal 24, each successive surge starting at a zero value increasing to a positive value and then decreasing back to the zero value. With the switch 42 closed, a positive voltage is developed across the resistor 38, because of the current conduction path created from terminal 24 through coil 34, switch 42, resistor 40, and resistor 38 to terminal 26, thereby throwing the SCR 36 into conduction. (When the switch 42 is open, no current flows in resistor 38 and, therefore, the voltage from the gate to cathode of the SCR 36 is zero, thereby disabling current conduction through SCR 36 unless, of course, it has already been turned on by a gating voltage.)

As stated before the SCR 36 is inherently a bistable element having two different current conducting states. The coil 34 is energized when the SCR 36 is actuated by the closure of switch 42, the energizing path for the clutch coil 34 being from terminal 24 to terminal 26. Because the forward voltage drop of SCR 36 is inherently low, practically the entire voltage from the source 14 is applied across coil 34, thereby energizing it. As long as the switch 44 remains open, the coil 34 will remain energized. Current flow also occurs from terminal 24 through resistor 32, diode 46, and SCR 36 to terminal 26, thereby shunting or effectively short-circuiting the coil 30. This follows since the combined forward impedances of the diode 46 and the SCR 36 are less than that of the brake coil 30. As stated before, the full-wave rectified voltage appearing at terminal 24, periodically falls to a value of zero. However, because of the inductive backswing from the clutch coil 34, a positive voltage is maintained on the SCR 36 when the voltage at terminal 24 goes to zero. Another way of looking at the action of the clutch coil 34 is to note that the voltage at the anode of SCR 36 is maintained relatively constant with respect to the pulsating voltage at terminal 34 and, therefore, the coil 34 acts as a filter removing the higher frequency components of the voltage at terminal 24. This, of course, is in accord with known inductor action—that is, the impedance thereof increases with increasing frequency. Hence, the coil 34 may be thought of as having a double function, namely: (1) that of actuating the clutch of the drive motor, and (2) that of maintaining the SCR 36 in its high current conduction state.

As already stated, the switches 42 and 44 are of the momentary contact type. The switches need be closed only a very short period of time to trigger the circuit into operation. This time typically is 1/20 to 1/60 of a second. Therefore, when it is desired to actuate the brake coil 30 by closing the switch 34, the switch 42 will be open. It should be noted at this time, however, that if the switch 42 is maintained in its closed condition, it overrides the action of switch 44 on the circuit and will maintain the clutch coil 34 actuated. The closure of switch 44 connects diode 54 in parallel with the clutch coil 34 with such a polarity that the inductive backswing from clutch coil 34 is now shunted through diode 54 and effectively removed from the anode of SCR 36. At the next half cycle of the pulsating voltage at terminal 24, the voltage goes to zero and the SCR 36 stops conducting, there being no voltage on the anode thereof to maintain it in its high current conducting state.

The clutch is released almost immediately after switch 44 is closed and the brake is engaged. Only momentary closure of switch 44 is required to switch the circuit to the "stop" condition, which is maintained until the operate switch 42 is actuated again. Hence upon the closure of switch 44, brake coil 30 is energized through resistor 32 from terminal 24 to terminal 26, the SCR 36 being thrown into its non-conductive state. Hence, the brake coil 30 may be thought of as being normally responsive to the voltage source 14. Further, the voltage source 14 may be thought of as a source of unfiltered full-wave rectified voltage. Also, the clutch coil 34 is normally non-responsive to the voltage source 14 while SCR 36 is a bistable element for rendering clutch coil 34 responsive to the source 14 while at the same time rendering brake coil 30 non-responsive to source 14. Switch 44 is a means for switching the SCR 36 to its low current conduction state and thereby return the clutch coil 34 to its normally non-responsive relation with respect to the source 14 and the brake coil 30 to its normally responsive relation to the source 14.

The switch 44 in a typical application of the invention is operated by an actuator associated with a turntable driven by the drive motor. For example, when an operator closes the switch 42 on a control panel, the turntable commences rotation. During the rotation of the turntable, some operation is performed upon objects placed thereon, for example, material may be packaged into containers placed on the turntable. When it is necessary to stop the turntable, this is done automatically since the switch 44 is typically associated with a switch actuator element mechanically associated with the turntable. Switch 44 may be actuated periodically or may be actuated whenever some fault is detected.

Illustrative values of the components are given in the drawing. These values are given only for the purpose of illustrating a typical working embodiment and there is no intention to limit the invention to these values.

Other objects and advantages, and even further modifications of the invention will become apparent to those of ordinary skill in the art upon reading this disclosure. However, it is to be understood that this disclosure is illustrative of the invention, and not limitative thereof, the invention being defined by the appended claims.

I claim:

1. A circuit for controlling an assembly comprising:
   a source of full wave rectified voltage,
   first assembly means having an operative and an inoperative condition and being connected to said source so as to normally be in said operative condition,
   electronic switch means switchable into a conductive state from a non-conductive state, said electronic switch means remaining in said conductive state after switching as long as current flows through said electronic switch means and returning to said non-conductive state when current ceases flowing through said electronic switch means,
   second assembly means having an operative and an inoperative condition and including a coil having a given inductance connected to said source via said electronic switch means, said second assembly means assuming said operative condition when current flows through said coil and assuming said inoperative condition when current ceases flowing through said coil,
   first switch means for causing said electronic switch means to switch into said conductive state so that current passes through said coil so that said second assembly means assumes said operative condition,
   first switch means for causing said electronic switch means to switch into said conductive state so that current passes through said coil so that said second assembly means assumes said operative condition,
   means for causing said first assembly means to assume said inoperative condition when said first switch means causes said electronic switch means to switch into said conductive state and to assume said operative condition when said electronic switch means assumes said non-conductive state, and
   second switch means for completing an electrical path around said coil so that the current through said electronic switch means ceases when the said full wave rectified voltage is equal approximately to zero, thereby causing said electronic switch means to assume said non-conductive state, said second assembly means to assume said inoperative condition and said first assembly means to assume and operative condition.

2. A circuit as in claim 1 wherein said electronic switching means is a silicon controlled rectifier.

3. A circuit as in claim 2 wherein said brake means includes a coil.

References Cited

UNITED STATES PATENTS

| | | | |
|---|---|---|---|
| 2,778,978 | 1/1957 | Drew | 317—137 |
| 3,004,709 | 10/1961 | Hays | 317—137 X |
| 3,183,416 | 5/1965 | Circle | 317—148.5 |
| 3,311,794 | 3/1967 | Holland et al. | 317—137 X |
| 3,335,333 | 8/1967 | Myers | 317—149 |
| 3,353,071 | 11/1967 | Cable | 317—148.5 |
| 3,154,727 | 10/1964 | Hulls | 317—149 |

JOHN F. COUCH, Primary Examiner

STANLEY WEINBERG, Assistant Examiner

U.S. Cl. X.R.

310—94; 317—149